April 22, 1969

R. L. HALL 3,439,481

FRUIT HARVESTING APPARATUS

Filed July 7, 1966

INVENTOR.
ROBERT LEE HALL
BY John R. Walker, III
Attorney

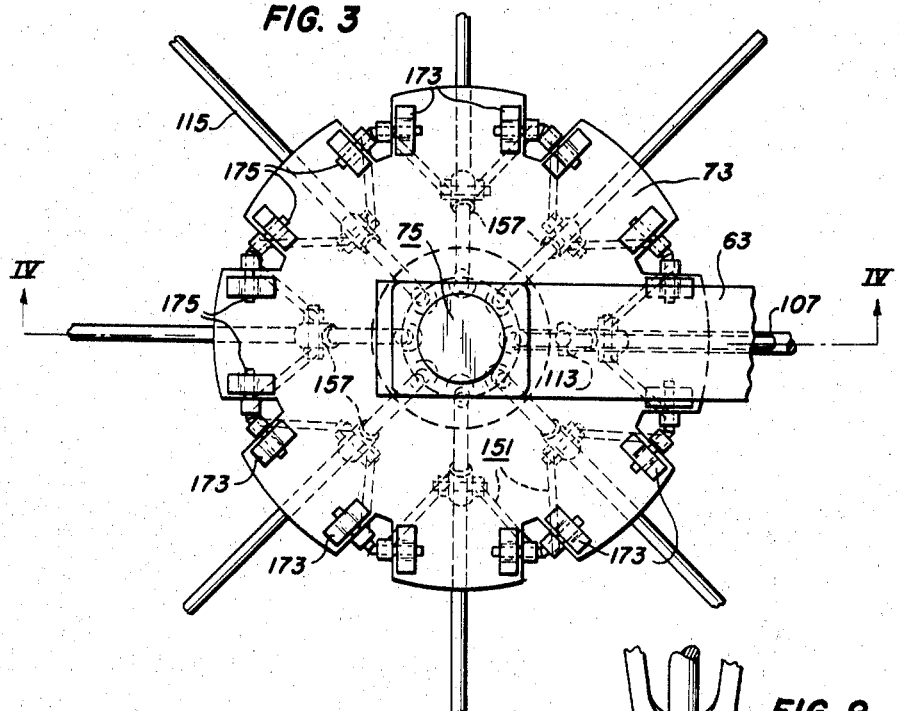
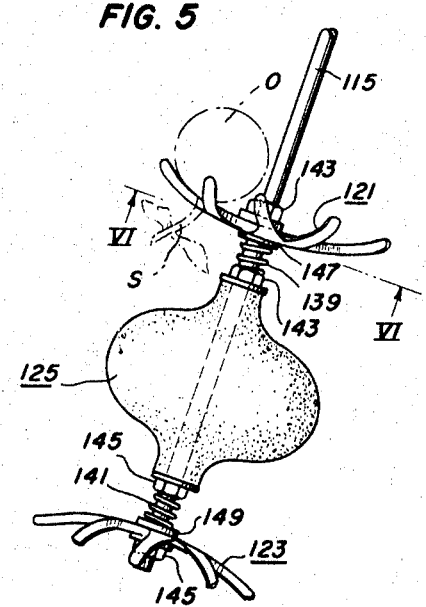
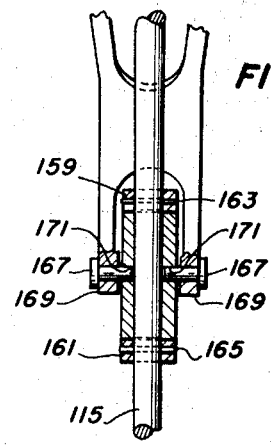
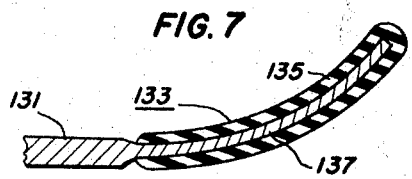

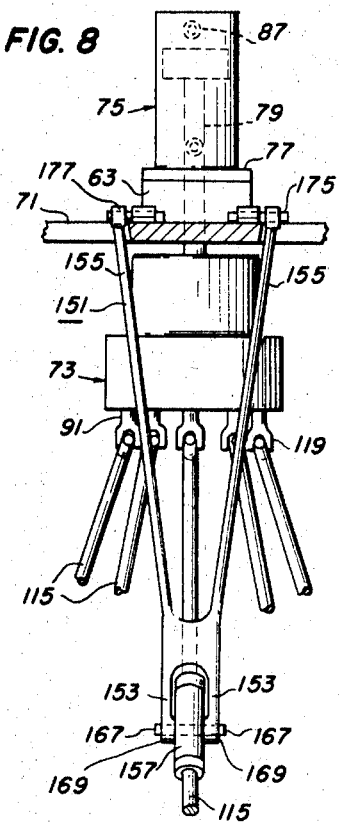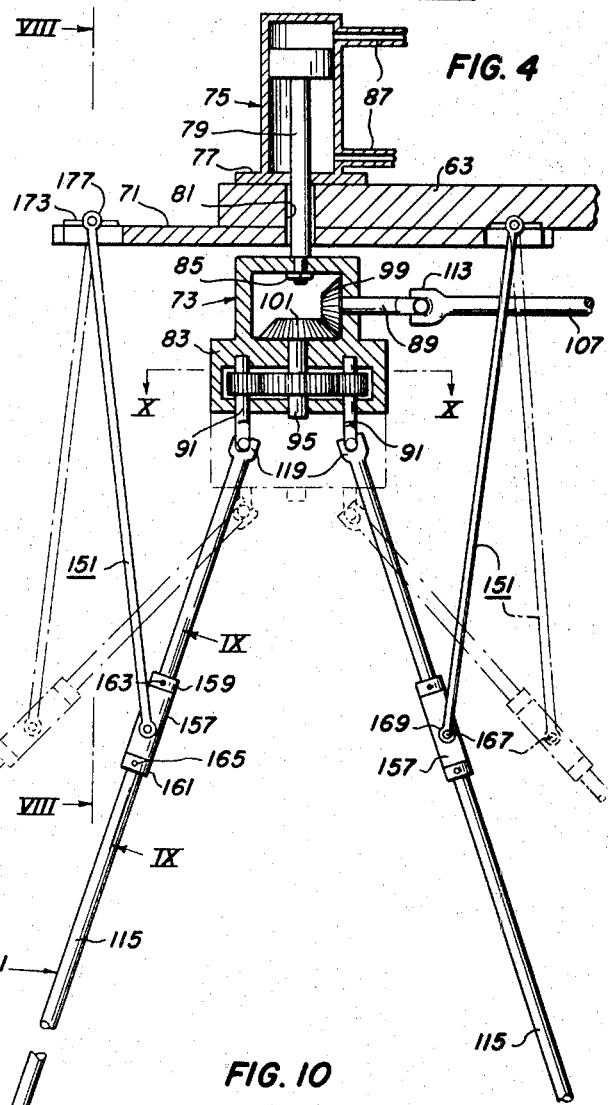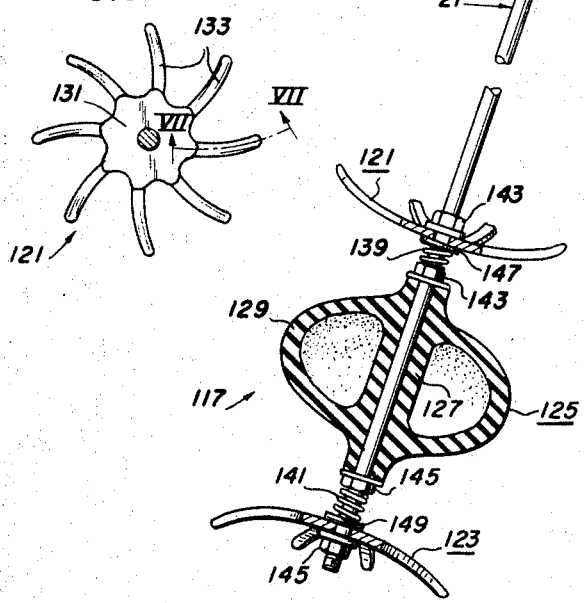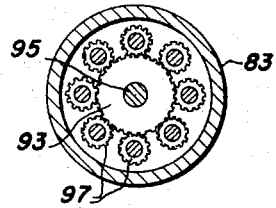

United States Patent Office 3,439,481
Patented Apr. 22, 1969

3,439,481
FRUIT HARVESTING APPARATUS
Robert Lee Hall, 1770 Brookside Drive,
Germantown, Tenn. 38038
Filed July 7, 1966, Ser. No. 563,561
Int. Cl. A01g *19/00*
U.S. Cl. 56—328                9 Claims

ABSTRACT OF THE DISCLOSURE

Apparatus for severing oranges or like fruit items from fruit trees including a plurality of circularly arranged rotating fruit doffing wheels—each wheel having radially projecting fingers adapted to engage and sever the fruit items from the tree. The plurality of doffing wheels are pendantly supported from an elevated frame which in turn is supported by a boom mounted on vehicular base structure such as a tractor vehicle. The boom means being operative to selectively raise or lower the frame structure thereby lifting and lowering the circular plurality of fruit doffing wheels about the vertical center axis of the fruit tree. The circular plurality of doffing wheels are also simultaneously movable radially inwardly and outwardly to radially contracted or expanded dispositions while being moved upwardly and downwardly thereby engaging and removing the fruit items from a fruit tree.

---

This invention relates to apparatus for harvesting oranges or like tree-borne fruit and particularly relates to an apparatus for individually severing each orange or fruit item from a fruit tree.

The basic concept of the invention includes: Providing a circular cluster of individually rotating fruit doffing members; suspending the cluster of rotating doffing members concentrically about an orange-bearing tree; and then, moving the cluster of rotating doffing members up and down and radially inwardly and outwardly within the foliage of the tree to snap the oranges from the tree branches—the oranges severed from the tree branches, falling on a net or the like place under the tree.

Various orange harvesting apparatuses have been introduced. Currently, none of these apparatuses seem to work very satisfactorily and the oranges are still predominantly picked from the tree by hand. Occasionally, mechanical tree-shaker type harvesters are used that grip the tree trunk or tree limb and shake the fruit to the ground. Such an implement has several disadvantages in that the violent shaking action tends to damage the tree trunk and limbs and also the root system of the tree. When the oranges are shaken from the tree, they are often thrown a considerable distance and are propelled with enough force to damage the fruit. Other orange harvesting devices have been complicated and cumbersome or for various reasons have not been found workable.

This invention seeks to eliminate the above-mentioned problems and has as a primary object to provide a mechanical means for harvesting oranges economically and with minimum damage to the fruit.

A further object is to provide a fruit harvesting apparatus which is relatively mechanically simple and does not include complicated or intricate parts to malfunction.

A further object is to provide a mobile fruit harvesting apparatus which may be readily moved from tree to tree in harvesting the oranges.

A further object is to provide a fruit harvesting apparatus which is readily collapsible into a comparatively compact unit for road travel or for transporting the apparatus.

A further object is to provide a fruit harvesting apparatus which uniformly removes the fruit from substantially all parts of a fruit tree and will remove the fruit equally as readily from all sides or from the top or bottom branches of a tree.

A further object is to provide a fruit harvesting apparatus that is relatively easy to operate and maintain.

The means by which the foregoing and other objects of the present invention are accomplished and the manner of their accomplishment may be readily understood from the following specification upon reference to the accompanying drawings, in which:

FIG. 3 is an enlarged top plan view taken as on the line III—III of FIG. 1.

FIG. 4 is a vertical plane sectional view taken as on the line IV—IV of FIG. 3, and additionally including a sectional showing of a fruit doffing member.

FIG. 5 is an elevational view of the fruit doffing member of FIG. 4.

FIG. 6 is a face view of a fruit doffing wheel taken as on the line VI—VI of FIG. 5.

FIG. 7 is an enlarged sectional view of a finger portion of a fruit doffing wheel taken as on the line VII—VII of FIG. 6.

FIG. 8 is a sectional view taken as on the line VIII—VIII of FIG. 4.

FIG. 9 is an enlarged sectional view taken as on the line IX—IX of FIG. 4.

FIG. 10 is a sectional view taken as on the line X—X of FIG. 4.

Figure 1:
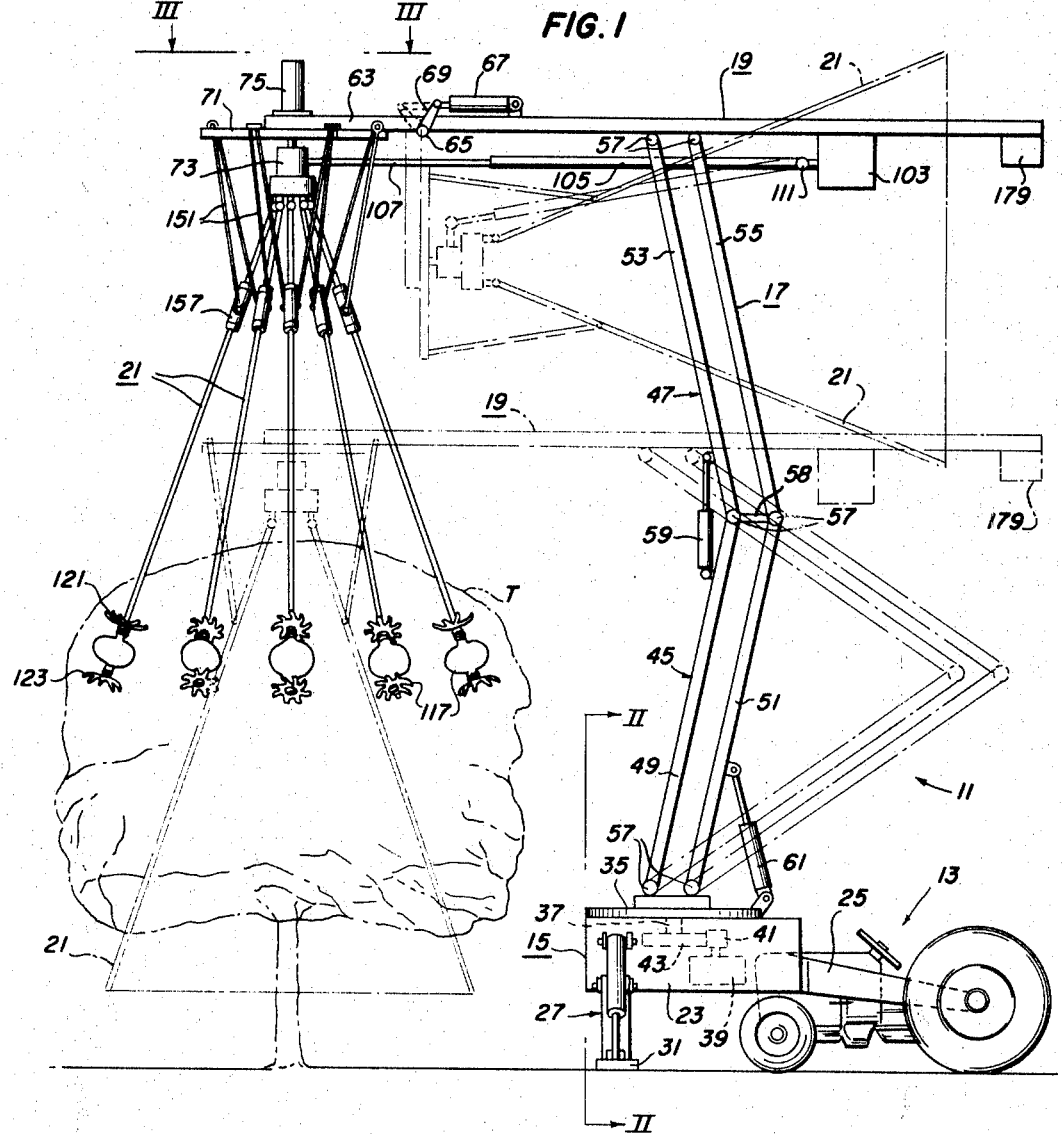
FIG. 1 is a side elevational view of the fruit harvesting apparatus of the present invention with portions thereof being schematically shown.
Figure 2:
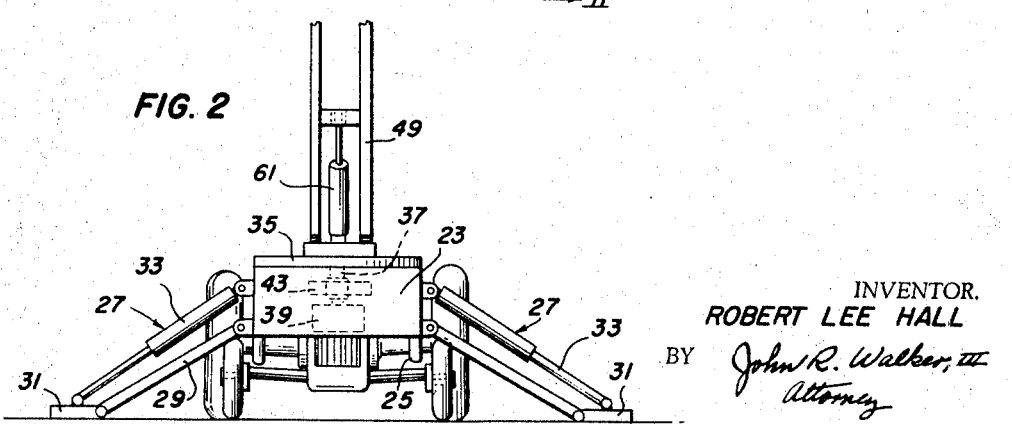
FIG. 2 is a front elevational view taken as on the line II—II of FIG. 1.

The fruit harvesting apparatus of the present invention may optionally be incorporated in a unitary self-propelled assembly in the form of a complete machine or may be incorporated in an attachment type assembly adapted to be mounted on and used in combination with a crawler or a wheel-type tractor. For purposes of clarity in description, the apparatus will be described as being in the form of an attachment assembly 11 removably fitted on a wheel-type tractor 13.

Assembly 11 includes basically a base 15, a main and a jib boom 17, 19 respectively supported on base 15 and a circular cluster of fruit doffing stems 21 pendantly supported from jib boom 19. Base 15 is generally rectangular and formed of plate material and includes a rearwardly disposed pair of leg members 25 and a forwardly disposed pair of outrigger members 27. The rearward part of body 23 is substantially fitted around the forward portion of tractor 13. Leg members 25 substantially straddle the tractor and extend between the tractor drive axle and the main portion of base body 23. Movable outrigger members 27 are adapted to be raised or lowered for stabilizing the apparatus as a fruit tree is being harvested. Each outrigger 27 includes a strut assembly 29 including a foot member 31 and a piston-cylinder assembly 33. Strut assembly 29 and piston-cylinder assembly 33 are generally parallel arranged and are pivotally connected at the respective end portions thereof in a somewhat typical manner. Suitable conduit means (not shown) connecting with the hydraulic system of the tractor provides motive force for the outrigger members. A turntable assembly 35 is mounted on base body 23 and pinioned on shaft 37. A hydraulic rotary actuator 39 is fixedly mounted in base body 23 and actuates turntable 35 through pinion and bull gears 41, 43.

Main boom 17 includes pivotally connected lower and upper sections 45, 47 including respectively paired forward and rearward longitudinal stringer members 49, 51 and 53, 55. Pin means 57 pivotally connect the parallel arranged lower and upper sections 45, 47 together, the lower end of lower section 45 to turntable 35 and the upper end of upper section 47 to the intermediate under portion of horizontal jib boom 19. A link 58 is pivotally connected between stringer members 49, 53 and 51, 55 at the joint of the upper and lower sections 45, 47. Coactingly operative upper and lower piston-cylinder assemblies 59, 61 provide movable support means for positioning jib boom 19 at a desired elevation. Selectively operative hydraulic force means (not shown) connecting piston-cylinder assemblies 59, 61 to the hydraulic system of tractor 13 provide means for selectively positioning horizontal jib boom 19 vertically. Actuating hydraulic motor 39 of turntable 35 is operable for swinging jib boom 19 in a horizontal arc.

A jib boom extension member 63 is pivotally secured to the forward end portion of jib boom 19 and is downwardly swingable about a connecting pin 65 (see broken line position in FIG. 1). A piston-cylinder assembly 67 based from the forward portion of jib boom 19 and operable through arm 69 provides means for swinging boom extension 63 to and from a horizontal or a vertical position. Typical conduit and control valve means (not shown) operatively connect piston-cylinder assembly 67 to the hydraulic system of tractor 13.

A generally circular horizontal frame 71 is fixedly secured to the undersurface of jib boom extension member 63. A power dividing type transmission unit 73 is centered under circular frame 71 and is supported by a piston-cylinder assembly 75 mounted vertically on the distal end portion of jib boom extension member 63 (see FIG. 4). The cylinder base 77 of piston-cylinder assembly 75 is fixedly secured on the upper surface of the extension member and piston rod 79 projects downwardly through an aperture 81 in the extension member and frame 71. The shouldered lower end portion of piston rod 79 extends through an aperture in the upper portion of transmission case 83 and is firmly secured by a nut 85 threaded on the end of the piston rod. Conduit means 87 (fragmentarily shown) operatively connect piston-cylinder assembly 75 with the hydraulic system of tractor 13. Actuating piston-cylinder assembly 75 raises or lowers transmission unit 73.

The transmission unit includes a power input shaft 89 and a plurality of output shafts 91. A sungear 93 mounted on vertical shaft 95 engages and drives a plurality of planet pinions 97 of respective output shafts 91. Meshing 45° miter gears 99, 101 fixed respectively on input shaft 89 and sungear shaft 95 drive the sungear and planet pinions. A suitable power unit 103, as for example an electric motor or an internal combustion type motor is pendantly secured from the rearward under portion of jib boom 19. Telescopically coupled drive shaft sections 105, 107 and universal joints 111, 113 operably connect power unit 103 with transmission unit 73 so that stems 21 are caused to rotate. Telescopic drive shaft sections 105, 107 and the universal joint means provide flexible drive means for the up and down movement of the transmission unit and for swinging the jib boom extension member and transmission unit downwardly to the broken line apparatus-transporting position illustrated in FIG. 1.

Each fruit doffing stem 21 preferably includes a long substantially narrow shaft part 115 and a fruit doffing head part 117. Each fruit doffing stem preferably is supported and driven from a respective output shaft 91 of transmission unit 73. A universal joint member 119 connects doffing stem shaft 115 to transmission unit output shaft 91. Head part 117 of each fruit doffing stem 21 directly engages the fruit and preferably includes an upper and a lower generally dish-shaped doffing wheel 121, 123 and a tuber or globular guide member 125 (see FIGS. 4-7). Each globular guide member 125 includes a somewhat tubular central portion 127 and a body portion 129 integrally secured concentrically around the central portion. Guide member 125 is preferably formed of rubber or semi-resilient plastic material and preferably includes a resilient peripheral surface. The distal end portion of doffing stem shaft 115 extends through central portion 127 of guide member 125; the guide member is firmly fixed on and rotates with doffing stem shaft 115.

Doffing wheels 121, 123 are alike although oppositely arranged. The following description of upper wheel 121 will suffice also for lower wheel 123: Wheel 121 includes an apertured hub portion 131 and a plurality of finger portions 133 radiating obliquely from the hub portion. Each finger portion 133 of doffing wheel 121 preferably includes a relatively thick rubber or semi-resilient sheath portion 135 covering the tine 137 of the finger portion (see FIG. 7). Doffing wheels 121, 123 are oppposingly arranged on opposite sides of guide member 125. The doffing wheels normally turn with the guide member and doffing stem shaft 115. The radially projecting finger portions respectively of the upper and lower doffing wheels are inclined upwardly and downwardly relative to a plane of rotation of each wheel, and when viewed from above, as in FIG. 6, are curved towards the direction of rotation (counterclockwise, as viewed in this figure). The rotating finger portions of the doffing wheels are operative in engaging and snapping the orange stems S (see FIG. 5). Slipclutch means are provided for each doffing wheel for preventing the rotation of a wheel when it becomes entangled with a limb of the fruit tree; coiled compression springs 139, 141, adjustable nuts 143, 145 and friction disk members 147, 149 provide selectively pretensionable slipclutch means for driving upper and lower doffing wheels 121, 123.

It will be understood that more than one guide member 125 with associated parts (wheels 121, 123 and slipclutch means) may be provided on each shaft 115 without departing from the spirit and scope of the present invention. Also, it will be understood that, if desired, one of the wheels 121 or 123 may be omitted without departing from the spirit and scope of the present invention.

A plurality of link members 151 articulatingly support respectively a plurality of doffing stems 21 from circular frame 71. Each link member 151 is generally H-shaped and includes oppositely projecting paired leg portions 153 and arm portions 155 (see FIGS. 8 and 9). A tubular sleeve 157 is freely journalled on each doffing stem shaft 115. Upper and lower collars 159, 161 fixed on each stem shaft 115 by pins 163, 165 prevent axial displacement of each sleeve 157. Diametrically opposed trunnion pins 167 fixed in link leg eye portions 169 and freely fitted in sleeve sockets 171 pivotally connect the sleeve and link members. Paired apertured brackets 173 are circumferentially secured to the upper surface of circular frame 71 (see FIG. 3). Paired pins 175 extend through paired frame brackets 173 and eye portions 177 of each link member 151 and pivotally secure each link member to frame 71. Actuating piston-cylinder assembly 75 and moving transmission unit 73 upwardly uniformly moves the plurality of doffing stem head parts 117 radially inwardly. A weight member 179 fixed to the rearward end portion of horizontal jib boom 19 counterbalances the weight of fruit doffing stems 21 and the parts of the apparatus supported from the forward end of the jib boom.

The operation of apparatus 11 may be carried out in the following manner: With main boom 17 fully extended and jib boom 19 in a full elevated position, tractor 13 and the apparatus is moved along the ground to a place adjacent the fruit tree to be harvested and to such a position whereby the plurality of doffing stems are centered over the tree. Turntable actuator 39 may be activated to horizontally swing the fruit doffing stems to a centered position over the tree. Piston-cylinder assemblies 33 are actuated to set outrigger members 27 and foot members 31 of the outriggers against the ground for stabilizing the apparatus. With transmission unit 73 moved downwardly and the plurality of fruit doffing stems 21 moved outwardly, piston-cylinder assemblies 59, 61 are retracted to lower jib boom 19 and lower the fruit doffing stems circumferentially around the fruit tree. Piston-cylinder assembly 75 is actuated to move transmission unit 73 upwardly and the plurality of doffing stems inwardly and into the foliage of the tree. With the doffing head parts 117 rotating, piston-cylinder assemblies 59, 61 are actuated to move jib boom 19 and the plurality of fruit doffing heads upwardly and downwardly to engage and remove the oranges from the tree. Upper doffing wheels 121 are arranged to engage the oranges as the doffing stems are moved upwardly; lower doffing wheels 123 are arranged to engage the oranges as the doffing stems are moved downwardly. It will be understood that the action of the doffing wheels 121, 123 is a combination pulling and twisting action that substantially duplicates the hand action in hand picking. Thus, as will be seen in FIG. 5, the orange O is pulled upwardly by wheel 121 with the stem S extending between an adjacent pair of finger portions 133, and while being pulled, the orange is twisted. Also, it should be noted that guide member 125 prevents entanglement of fingers 133 with the limbs of the tree. By manipulating the plurality of fruit doffing head parts 117 inwardly and outwardly and upwardly and downwardly the apparatus may sever the fruit from any part of the tree. After the fruit has been removed from the tree, doffing stems 21 are raised and the apparatus moved to another tree.

When it is desired to transport the apparatus a considerable distance, the following procedure may be carried out: Piston-cylinder assembly 67 is extended thereby turnably moving jib boom 63 downwardly and the plurality of doffing stems 21 upwardly (see broken line position in FIG. 1). Piston-cylinder assemblies 59, 61 are retracted, thereby retracting main boom 17 and lowering jib boom 19. The outrigger members of base 15 are retracted from the ground and the apparatus is ready for ground travel.

In the above-described embodiment of the invention, each doffing stem includes a head part 117 driven and supported by a long shaft 115. It is contemplated that in certain embodiments of the invention a slight modification in each fruit doffing stem may be made and the rotating head part of each doffing stem would be driven but not supported by a long shaft. Thus, it is contemplated that each head part be rotatably supported by rigid structure such as an arm or the like pendantly and pivotally supported from the superstructure frame and that the rotating head part be driven by a shaft journalled in the arm, or by an individual fluid or electrical motor supported on each arm. It is also considered that other means for radially moving the plurality of doffing heads may be utilized other than the means exemplarily described in this specification. It will further be noted that although the invention has been described chiefly as being used for harvesting oranges, it is considered to be applicable also for harvesting other citrus fruits, apples, pears and similar fruits. It will be understood that the fingers 133 should be of different sizes for different sizes of fruits.

I claim:

1. In apparatus for severing the fruit from a citrus fruit tree and the like, a plurality of circularly arranged and generally upright fruit doffing stems adapted to circumferentially embrace the fruit tree substantially concentrically relative to the vertical axis of the tree, each stem of said plurality of fruit doffing stems having an upper proximal end and a lower distal end including a normally continuously rotatable fruit doffing wheel adjacent the lower distal end of the stem, means for supporting said plurality of doffing stems respectively at the proximal end of each stem including means for raising and lowering the plurality of doffing wheels, means for moving the doffing wheels inwardly and outwardly radially respectively between a generally circular contracted and a generally circular expanded arrangement, and power developing and transmitting means operatively connected with each said stem for normally rotating each said doffing wheel in 360° rotation about its axis.

2. In apparatus for severing the fruit from a citrus fruit tree and the like, a plurality of circularly arranged and generally upright fruit doffing stems adapted to circumferentially embrace the fruit tree substantially concentrically relative to the vertical axis of the tree, each stem of said plurality of fruit doffing stems having a proximal end and a distal end and including a rotatable fruit doffing head part at the lower distal end of the stem, means for supporting said plurality of doffing stems respectively at the proximal end of each stem including means for raising and lowering said plurality of doffing stems and means for moving the distal head parts thereof inwardly and outwardly respectively between a contracted and an expanded arrangement, and power developing and transmitting means operatively connected with each said stem for rotating each said fruit doffing head part, said means for supporting said plurality of doffing stems including a mobile ground engageable base, boom means supported from said base, a generally horizontal frame means supported from the upper end of said boom means, and means connecting with said upper proximal end portion of each stem for movably supporting said plurality of doffing stems from said frame means, said means connecting with the upper proximal end portion of each stem for supporting said plurality of doffing stems from said frame means and the power developing and transmission means for rotating each fruit doffing head part including a power dividing type transmission unit including a power input shaft and a plurality of power output shafts, means connecting said plurality of output shafts respectively to the upper proximal end portions of said plurality of doffing stems and means operatively connecting said frame means and said power transmission unit.

3. A fruit severing apparatus as defined in claim 2 in which said means connecting said frame and said power transmission unit includes fluid powered selectively operable piston-cylinder means for selectively positioning said transmission unit between an up and a down position relative to said frame, and additionally includes articulated link means interconnecting each doffing stem and said frame and coactingly operative with the up and down movement of said transmission unit for radially expanding or contracting said head parts of said plurality of doffing stems.

4. In apparatus for severing the fruit from a citrus fruit tree and the like, a plurality of circularly arranged and generally upright fruit doffing stems adapted to circumferentially embrace the fruit tree substantially concentrically relative to the vertical axis of the tree, each stem of said plurality of fruit doffing stems having a proximal end and a distal end and including a rotatable fruit doffing head part at the lower distal end of the stem, means for supporting said plurality of doffing stems respectively at the proximal end of each stem including means for raising and lowering said plurality of doffing stems and means for moving the distal head parts thereof inwardly and outwardly respectively between a contracted and an expanded arrangement, and power developing and transmitting means operatively connected with each said stem for rotating each said fruit doffing head part, said means for supporting said plurality of doffing stems including a mobile ground engageable base, boom means supported from said base, a generally horizontal frame means supported from the upper end of said boom means, and means connecting with said upper proximal end portion of each stem for movably supporting said plurality of doffing stems from said frame means, said head part of each doffing stem including at least one doffing wheel having radially projecting finger portions rotatable in a path lying substantially perpendicular to the length of said doffing stem, and said finger portions being curved in the direction of rotation thereof.

5. In apparatus for severing the fruit from a citrus fruit tree and the like, a plurality of circularly arranged and generally upright fruit doffing stems adapted to circumferentially embrace the fruit tree substantially concentrically relative to the vertical axis of the tree, each stem of said plurality of fruit doffing stems having a proximal end and a distal end and including a rotatable fruit doffing head part at the lower distal end of the stem, means for supporting said plurality of doffing stems respectively at the proximal end of each stem including means for raising and lowering said plurality of doffing stems and means for moving the distal head parts thereof inwardly and outwardly respectively between a contracted and an expanded arrangement, and power developing and transmitting means operatively connected with each said stem for rotating each said fruit doffing head part, said means for supporting said plurality of doffing stems including a mobile ground engageable base, boom means supported from said base, a generally horizontal frame means supported from the upper end of said boom means, and means connecting with said upper proximal end portion of each stem for movably supporting said plurality of doffing stems from said frame means, said head part of each doffing stem including an upper and a lower doffing wheel having radially projecting finger portions rotatable respectively in a path lying perpendicular to the length of said doffing stem, and additionally includes a guide member rotatable with and disposed between said upper and lower doffing wheels.

6. A fruit severing apparatus as defined in claim 5 in which the radially projecting finger portions respectively of said upper and said lower doffing wheels are inclined respectively upwardly and downwardly relative to a plane of rotation of each wheel and in which the path of rotation and the configuration of each wheel is generally dish-shaped, and in which said finger portions are curved in the direction of rotation thereof.

7. A fruit severing apparatus as defined in claim 5 in which each said doffing wheel includes selectively pretensionable slipclutch means for driving said upper and said lower doffing wheel.

8. In apparatus for severing the fruit from a citrus fruit tree and the like, a power dividing type power transmission unit including a power input shaft and a plurality of power output shafts; power developing and transmitting means connected to said power input shaft for driving said plurality of output shafts; a circular plurality of generally upright fruit doffing stems adapted to circumferentially embrace the fruit tree substantially concentrically relative to the vertical axis of the tree; each stem of said plurality of fruit doffing stems including a long generally upright shaft and a fruit engageable head secured on the lower end of said shaft; universal joint means including a universal joint articulatingly connecting the upper end portion of said shaft of each stem to a respective output shaft of said transmission unit; a generally horizontal frame; means interposedly connecting said frame and said transmission unit for selectively positioning said transmission unit between an up and a down position relative to said frame; means coactingly operative with the up and down movement of said transmission unit for radially expanding and contracting said head parts of said plurality of doffing stems; and selectively operable ground engageable means for supporting and elevatingly positioning said plurality of doffing stems circumferentially about the fruit tree.

9. Apparatus for severing oranges or like fruit items from a fruit tree comprising a frame structure, a plurality of fruit doffing heads, each head including a doffing wheel having radially projecting fingers, means for rotatingly supporting each doffing wheel generally on a vertical axis from said frame structure and beneath said frame structure, means for arranging said plurality of doffing wheels generally in an intermittently arranged horizontally generally circular configuration, selectively operative means for radially moving said plurality of doffing wheels inwardly and outwardly respectively to contracted or expanded generally circular configurations, and selectively operative means for substantially simultaneously raising or lowering said plurality of doffing wheels including means supported on the ground and operative respectively for raising or lowering said frame structure.

References Cited
UNITED STATES PATENTS

| | | | |
|---|---|---|---|
| 1,022,142 | 4/1912 | Johnson | 56—14 |
| 2,925,687 | 2/1960 | Pronio et al. | 56—328 X |
| 3,077,720 | 2/1963 | Grove et al. | 56—328 |
| 3,205,644 | 9/1965 | Gordinier | 56—328 |

ABRAHAM G. STONE, *Primary Examiner.*

PASQUALE A. ROZZANO, *Assistant Examiner.*